United States Patent [19]

Schneider

[11] Patent Number: 4,670,827

[45] Date of Patent: Jun. 2, 1987

[54] CONTROLLED REGENERATIVE D-C POWER SUPPLY

[75] Inventor: Hans-Peter Schneider, Herzogenaurach, Fed. Rep. of Germany

[73] Assignee: Siemens Aktiengesellschaft, Munich, Fed. Rep. of Germany

[21] Appl. No.: 826,104

[22] Filed: Feb. 5, 1986

[30] Foreign Application Priority Data

Mar. 1, 1985 [DE] Fed. Rep. of Germany ....... 3507298

[51] Int. Cl.⁴ .......................................... H02M 7/162
[52] U.S. Cl. ...................................... 363/48; 318/767; 318/803; 363/37; 363/81; 363/87; 363/129
[58] Field of Search ....................... 363/37, 81, 87, 48, 363/129, 47; 318/762, 767, 803, 812; 323/222

[56] References Cited

U.S. PATENT DOCUMENTS 4,375,612  3/1983  Wirth .................................... 363/48

FOREIGN PATENT DOCUMENTS 91519     5/1984  Japan ..................................... 363/87
2107538   4/1983  United Kingdom .................. 363/37

Primary Examiner—William M. Beha, Jr.
Attorney, Agent, or Firm—Kenyon & Kenyon

[57] ABSTRACT

A regenerative d-c power supply comprises a bridge rectifier, a series-connected smoothing choke, a shunt-connected filter capacitor and a switching circuit consisting of a first diode disposed in a positive line of the d-c power supply between the smoothing choke and one terminal of the capacitor, a second diode disposed in a negative line of the power supply between another terminal of the capacitor and the rectifier and a pair of converter valves in the form of transistors connecting the cathodes of the diodes to one another and the anodes of the diodes to one another. Each converter valve is operated in the forward energy transmission direction by a respective first pulse sequence having pulses staggered in time with respect to the pulses of the other first pulse sequence. The converter valves are operated in the reverse energy transmission direction by respective second pulse sequences each having pulses staggered in time with respect to the pulses of the other second pulse sequence. The pulses of the first pulse sequences do not overlap one another, while the pulses of the second pulse sequences do overlap.

10 Claims, 6 Drawing Figures

CONTROLLED REGENERATIVE D-C POWER SUPPLY

BACKGROUND OF THE INVENTION

This invention relates to a controlled regenerative d-c power supply for converting a-c energy, received from an a-c power system, to d-c power for delivery to a load, where at times power flows in the reverse direction from the load and through the d-c power supply back to the a-c power system. This invention also relates to a method of operating such a regenerative d-c power supply and, more particularly, to a method for controlling an output voltage of the d-c power supply which is fed to load.

A controlled regenerative d-c power supply is disclosed in U.S. Pat. No. 4,375,612. In that d-c power supply, a-c energy from an a-c power system is converted by a phase-controlled SCR rectifier bridge, which is followed by a series-connected filter choke and a shunt-connected filter capacitor, to d-c power for delivery to a load. A positive line of the d-c power supply, connected to a positive terminal of the rectifier bridge, includes the filter choke, as well as a first diode, while a negative line, connected to the negative terminal of the rectifier bridge, includes a second diode. The cathodes of the two diodes are connected to one another by a first controllable converter valve in the form of a silicon controlled rectifier, the anodes of the two diodes being coupled to one another by a second controllable converter valve also in the form of a silicon controlled rectifier.

To control the magnitude of the d-c output voltage of the d-c power supply when power is being transmitted to the load, a voltage regulator component compares a reference voltage with the actual d-c output voltage and generates in response to the comparison an error signal transmitted to a driver stage. The driver stage activates the thyristors of the rectifier bridge in response to the error signal from the voltage regulator component.

In a power supply in accordance with the disclosure of U.S. Pat. No. 4,375,612, the maximum d-c output voltage equals the d-c voltage of an uncontrolled rectifier. In order to return to the a-c power network energy generated in the load, the controllable converter valves are controlled by means of another driver stage in response to a signal from the voltage regulator component. This component detects, by monitoring the d-c output voltage, the direction in which energy in being transported. The amount of current flowing back into the a-c power network is varied by the rectifier under the control of the voltage regulator component. As energy is being returned to the a-c power network, the magnitude of the d-c output voltage is necessarily reduced. Because of this process, it may happen that the controlled rectifier fails to commutate via the a-c power network. This phenomenon is termed "inverter commutation failure."

An object of the present invention is to provide an improved regenerative d-c power supply of the above-described type.

Another object of the present invention is to provide a method for the improved operation of such a d-c power supply.

Another, particular, object of the present invention is to provide such a method and apparatus in which the likelihood of inverter commutation failure is decreased.

Yet another particular object of the present invention is to provide such a method and apparatus in which the d-c voltage available at the output of the d-c power supply is greater than the voltage of an uncontrolled rectifier.

A further object of the present invention is to provide such a method and apparatus which has an enhanced efficiency.

SUMMARY OF THE INVENTION

The present invention is directed to a controlled regenerative d-c power supply for converting a-c energy, received from a-c power system, to d-c power for delivery to a load, where at times power flows in the reverse direction from the load and through the d-c power supply back to a-c power system. The power supply in accordance with the invention comprises a rectifier bridge having positive and negative output terminals for changing a-c energy from the a-c power system to d-c power for transmission to the load during an interval of forward energy transmission. A filter, including a series-connected smoothing choke and a shunt-connected capacitor, is coupled between the rectifier bridge and the load for providing filtered d-c voltage for the load. A switching assembly is interposed between the smoothing choke and the capacitor for effectively reversing the connections between the capacitor and the output terminals of the rectifier bridge to facilitate regeneration of power from the load and back into the a-c system during an interval of reverse energy transmission. The switching assembly includes a first diode connected between the smoothing choke and a terminal of the capacitor, a second diode connected between another terminal of the capacitor and the negative output terminal of the rectifier bridge, a first controllable converter valve which couples cathodes of the first and the second diode to one another, and a second controllable converter valve which couples the anodes of the first and second diode to one another. A control unit is operatively connected to the first and the second controllable converter valve for generating and delivering thereto a first pulse-width-modulated pulses sequence and a second pulse-width-modulated pulse sequence, respectively, to control the amount of energy fed to the load from the a-c power system during the interval of forward energy transmission and to control the amount of energy fed back to the a-c power system from the load during the interval of reverse energy transmission.

In accordance with the method of the present invention, each controllable converter valve of the switching assembly is driven, for both energy flow directions, by a pulse-width-modulated pulse sequence. By this method, the d-c output voltage of the d-c power supply can be increased beyond the maximally attainable d-c voltage of an uncontrolled rectifier. Moreover, the energ feedback into the a-c power system can be controlled without rectifier commutation failure.

To increase the magnitude of the d-c output voltage during forward energy transmission, pulses in the first pulse-width-modulated pulse sequence are staggered in time with respect to pulses of the second pulse-width-modulated pulse sequence and have pulse widths so related to the pulse widths of the pulses of the second pulse-width-modulated pulse sequence that the first and the second controllable converter valve are both blocked between the duty cycles. During this off period, the current built up through the smoothing choke can flow to the capacitor as a charging current. The charging current, and thus the mean of the d-c output voltage, can be modified by changing the pulses widths of the pulse sequences. The rectifier control angle remains constant and can assume any value between 0° and 90°. Owing to this method of control, a d-c output voltage will be produced which is higher than the corresponding voltage across the terminals of the rectifier, provided that the control angle remains constant. The maximum energy deliverable to the load is obtained in accordance with this method when the rectifier is driven in an uncontrolled rectifier mode.

During reverse energy transmission, i.e., from the load back to the a-c power system, the control angle of the rectifier is kept constant. The pulses of the first pulse-width-modulated pulse sequence are staggered in time with respect to the pulses of the second pulse-width-modulated pulse sequence and partially overlap the respective pulses thereof. The control unit includes a modulation component for changing the degree of overlap between the pulses of the first pulse sequence and the pulses of the second pulse sequence, whereby the current rise and, hence, the mean value of the current flowing back to the a-c power system via the bus bars of the d-c power supply can be varied.

For forced commutation of the rectifier thyristors when energy is being fed back to the a-c power system, the two pulse sequences for the controllable converter valves are interrupted for a time span, whereby the controllable converter valves are blocked. This time span corresponds to the recovery time of the rectifier thyristors and makes the thyristors commutate at zero current. This method prevents excessive voltages and thereby preserves the RC wiring of the thyristors.

In accordance with a particular feature of the present invention, the d-c power supply includes a first summing component operatively connected to output leads of the supply for forming a first difference between an actual d-c output voltage and a reference voltage. A voltage regulating component including a first intergrator is operatively linked to the first summing component for generating a reference current in response to the difference formed by the summing component. A second summing component is provided at an output of the voltage regulating component for forming a second difference between the reference current and an actual current flowing in the d-c power supply between the load and the a-c power system. A current regulating component including a second integrator is operatively linked to the second summing component for generating, in response to the second difference, an error signal related to a difference between the magnitude of actual energy flow through the d-c power supply and the magnitude of desired energy flow therethrough. A commutation component is operative tied to the voltage regulating component for generating a polarity signal indicating the plurality of the first difference. A modulator is operatively connected to the current regulating component and to the commutation component for generating the first and the second pulse-width-modulated pulse sequence in response to the error signal and the polarity signal. The modulator is connected to the converter valves for transmitting the respective pulse sequences thereto. The commutation means is operatively linked to the rectifier for controlling the operation thereof at least during the interval of reverse energy transmission.

DETAILED DESCRIPTION

Figure 1:
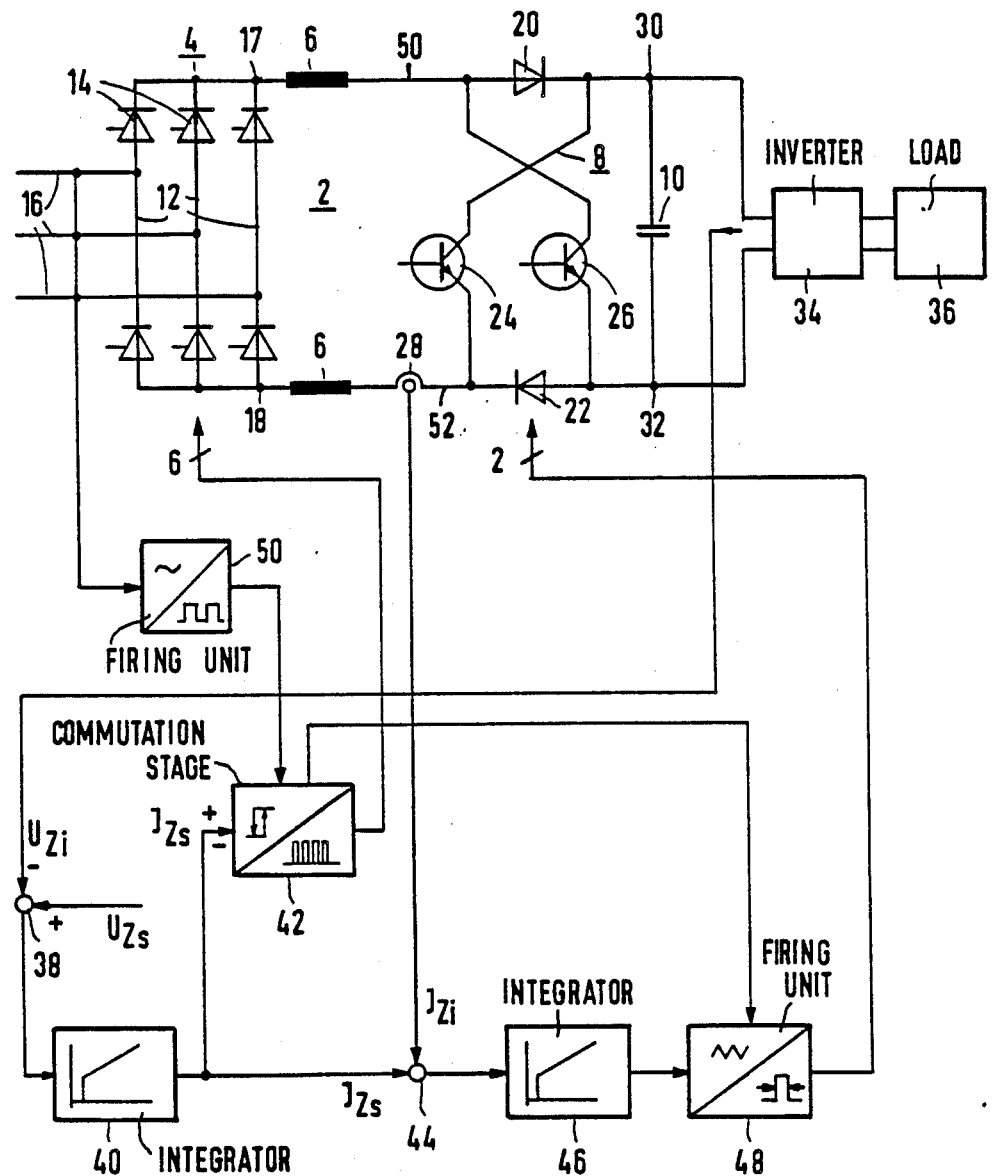
FIG. 1 is a block and circuit diagram showing a d-c power supply, including a voltage control with cascaded current control, in accordance with the present invention.
Figure 2:
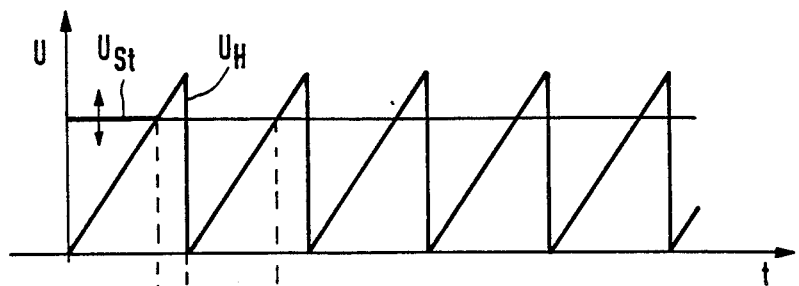
FIG. 2 is a graph showing a main control voltage and an auxiliary control voltage as functions of time.
Figure 3:
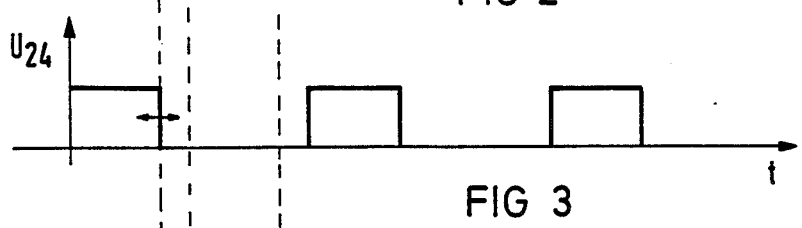
FIGS. 3 and 4 are graphs of pulse-width-modulated pulse sequences for operating controllable converter valves of the d-c power supply during an interval of forward energy transmission.
Figure 4:
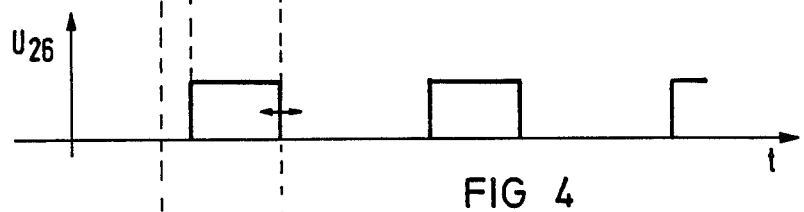
Figure 5:
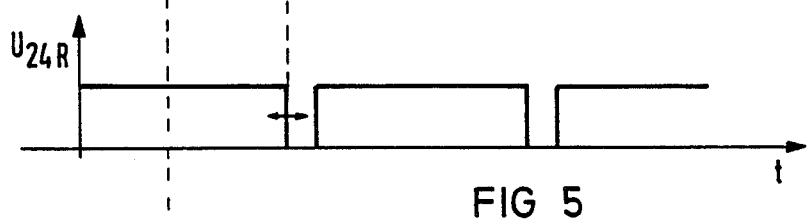
FIGS. 5 and 6 are graphs of pulse-width-modulated pulse sequences for controlling the operation of the controllable converter valves during an interval of reverse energy transmission.
Figure 6:
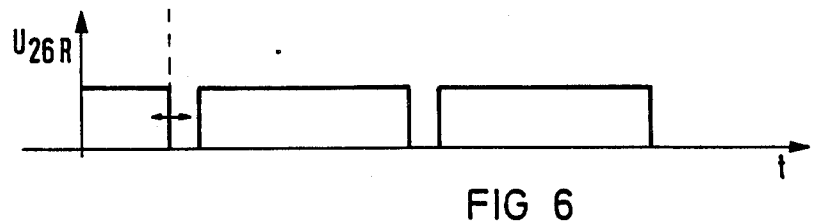

As illustrated in FIG. 1 a regenerative d-c power supply 2 having a voltage control with cascaded current control comprises a rectifier bridge 4, two smoothing chokes 6, a feedback circuit 8 and a smoothing capacitor 10. Rectifier 4 is a three-phase bridge circuit whose bridge branches 12 each include a thyristor 14.

Bridge branches 12 are fed via a-c power system bus bars 16, while positive output terminal 17 and negative output terminal 18 of the rectifier 4 are each connected to a respective smoothing choke 6.

In a positive line or bus bar 50 of the d-c power supply is disposed a first diode 20 having an anode connected to a respective one of the smoothing chokes 6 and a cathode connected to a positive output terminal 30 of the d-c power supply. A second diode 22 is connected in a negative line or bus bar 52 of the power supply and has an anode connected to a negative output terminal 32 of the power supply. The cathode of diode 22 is coupled to the negative terminal 18 of rectifier 4 via one of the smoothing chokes 6 and a current sensor or detector 28. Inasmuch as terminals 30 and 32 are coupled to respective plates of capacitor 10, the cathode of diode 20 and the anode of diode 22 are connected to the capacitor plates.

The cathodes of diodes 20 and 22 are connected to one another by a first switching component or controllable converter valve 24 in the form of a first transistor, while the anodes of the two diodes are interconnected by a second switching component or controllable converter valve 26 in the form of a second transistor.

Output terminals 30 and 32 of the d-c power supply are connected to an inverter 34 having an output in turn coupled to a load 36 such as an asynchronous motor. The d-c output voltage $U_{Zi}$ of the d-c power supply, i.e., the voltage component 38 which also receives a reference voltage $U_{Zs}$. The difference between actual voltage $U_{Zi}$ and reference voltage $U_{Zs}$, generated by summing component 38, is transmitted to a voltage regulator component 40 in the form of an integrator. An output signal generated by integrator 40 represents a reference current value $I_{Zs}$ and is fed to a first input of a second summing component 44 and to an input of a commutation stage 42. A second input of summing component 44 receives an actual current value $I_{Zi}$ from current detector or sensor 28.

The difference between actual current $I_{Zi}$ and reference current $I_{Zs}$, generated by summing component 44 in response to the inputs thereof, is transmitted to a current regulator component 46 in the form of a second integrator. Integrator 46 produces an error signal related to a difference between the magnitude of actual energy flow through the d-c power supply and the magnitude of desired energy flow therethrough. The error signal is fed to a firing unit or modulator 48 which has a pair of leads extending to the bases of transistors 24 and 26 for delivering thereto switching signals in the form of respective pulse-width-modulated pulse sequences, as described in detailed hereinafter with respect to FIGS. 2–6.

A firing unit 50 for rectifier 4 is connected to commutation stage 42. One output of commutation stage 42 is connected to firing unit or modulator 48, while another output of commutation stage 42 extends to thyristors 14 of rectifier 4.

Firing unit or modulator 48 includes a first circuit (not illustrated) for generating a constant d-c control voltage $U_{St}$, and a second circuit (not illustrated) for generating an auxiliary control voltage $U_H$ in the form of a sawtooth voltage.

In response to the alegbraic sign of the reference curren generated by integrator 40, commutation stage 42 produces and transmits to firing unit 48 a polarity signal having a first value in the event that energy is being transmitted to inverter 34 and load 36 from the a-c power system and a second value in the event that energy is being transferred back from the load to the a-c power system. If the polarity signal has the first value, firing unit 48 generates on its two output leads a pair of pulse-width-modulated pulse sequences $U_{24}$ and $U_{26}$ exemplarily illustrated in FIGS. 3 and 4. The pulses of pulse sequence $U_{24}$ are staggered with respect to respective pulses of pulse sequence $U_{26}$ and have leading edges coincident with every other zero point of sawtooth voltage $U_H$, while the pulses of sequence $U_{26}$ have leading edges coincident with the atternating zero points of sawtooth voltage $V_H$. The trailing edges of the pulses of sequence $U_{24}$ are determined by the intersection points between constant control volta $U_{St}$ and the inclined or sloping portion of every other tooth of sawtooth voltage $U_H$. Similarly, the trailing edges of the pulses of sequence $U_{26}$ are determined by the points of intersection of constant control voltage $U_{st}$ and the sloping portions of the other teeth of saw tooth voltage $U_H$. Firing unit 48 is provided with circuitry for varying the magnitude of control voltage $U_{st}$ in response to the magnitude of the error signal transmitted from integrator 46. Clearly, a change in that magnitude results in a change in the duration of the pulses of sequences $U_{24}$ and $U_{26}$.

If the polarity signal transmitted to firing unit 48 from commutation stage 42 has the second value, firing unit 48 generates on its two output leads a pair of pulse-width-modulated pulse sequences $U_{24R}$ and $U_{26R}$. The pulses of sequences $U_{24R}$ are staggered in time with respect to pulses of sequence $U_{26R}$ and, like the pulses of sequence $U_{24}$, have leading edges substantially simultaneous with every other zero point of sawtooth voltage $U_H$, while the pulses of sequence $U_{26R}$ have leading edges substantially simultaneous with the other zero points of voltage $U_H$. Like the pulses of sequence $U_{24}$, the pulses of sequence $U_{24R}$ have trailing edges determined by, i.e., coinciding with, the intersection points of constant control voltage $U_{St}$ and the sloping portions of every other tooth of voltage $U_H$. However, the durations of the pulses of sequences $U_{24R}$ and $U_{26R}$ are greater than the period (the cycle time) of sawtooth voltage $U_H$ and less than two periods or cycles of that voltage, whereas the pulse durations of sequences $U_{24}$ and $U_{26}$ are less than one period of voltage $U_H$. Accordingly, the trailing edge of each pulse of sequence $U_{24R}$ falls within a sawtooth period subsequent to the period corresponding to the leading edge of the respective pulse.

Pulse sequences $U_{26}$ and $U_{26R}$ are identical to pulse sequences $U_{24}$ and $U_{24R}$, respectively, except for the relative staggering in time. Pulse sequences $U_{24}$ and $U_{26}$ are mutually staggered in time so that both controllable converter valves 24 and 26 are blocked during the duty cycles. It is by means of this pulse pause ratio that current built over smoothing chokes 6 and flowing as charging current into smoothing capacitor 10 is controlled. The d-c voltage across terminals 30 and 32 is thus increased beyond the d-c voltage of an uncontrolled rectifier, the rectifier being driven, for example, in the uncontrolled mode. A greater power output is obtainable in accordance with this method without the need for increasing the voltage carried by a-c power lines 16. It is therefore possible with a voltage across rectifier terminals 17 and 18 of 380 V to achieve a d-c output voltage $U_{Zi}$ of, for example, 600 V, whereby considerably more energy is fed to the load. Such an increase in energy amounts to as much as 20%.

Controllable converter valves 24 and 26 are opened and closed by pulse sequences $U_{24R}$ and $U_{26R}$ when energy is being fed back from load 34 and 36 to the a-c power system. During such an interval of reverse energy transmission, rectifier 4 is controlled in the inverter mode, the control angle being kept constant at, for example, 150°. Current flows from load 34 and 36 through output terminal 30, controllable converter valve 24 and a bridge branch 12 into the a-c power system and from that power system through another bridge branch 12 of the rectifier, controllable converter valve 26 and output terminal 32 back to the load. The current rise of the feedback current and, accordingly, the amount of energy being transmitted back to the a-c power system from the load, can be controlled by adjusting the amount of overlap between the pulses of sequences $U_{24R}$ and $U_{26R}$. The amount of overlap is adjusted by changing the magnitude of control voltage $U_{St}$. Excessive voltages (overvoltages) will occur at the commutation times, every 60°, of thyristors 14 of rectifier 4. To avoid the excessive voltages, controllable converter valves 24 and 26 are blocked for a time span corresponding to the recovery time of the thyristors, thereby forcing commutation of the thyristors. The thyristors can in this way commutate at a zero current without the need for RC wiring of the thyristors.

It is to be noted that only controllable converter valves 24 and 26 are being controlled in accordance with the method of the present invention. This control is used not only during energy feedback into the a-c power system, but also for supplying energy to the load. The method enables not only an energy feedback but also the arbitrary control of the d-c output voltage of the d-c power supply during intervals of forward energy transmission. The amount of energy being fed back to the a-c power system during intervals of reverse energy transmission is simply determined by controlling the amount of current flowing back. Moreover, in a method in accordance with the present invention, the d-c output voltage of the power supply can be maintained at a constant level, even in the event of a-c voltage fluctuations. In addition, the d-c output voltage may be increased beyond d-c voltage value of a controlled rectifier.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions and illustrations herein are proffered to facilitate comprehension of the invention and should not be construed to limit the scope thereof.

What is claimed is:

1. A controlled regenerative d-c power supply for converting a-c energy, received from an a-c power system, to d-c power for delivey to a load, where at times power flows in the reverse direction from the load and through the d-c power supply back to the a-c power system, said power supply comprising:

rectifying means, including a rectifier bridge having positive and negative output terminals, for changing a-c energy from the a-c power system to d-c power for transmission to the load during an interval of forward energy transmission;

filter means, including a series-connected smoothing choke and a shunt-connected capacitor, coupled between said bridge and the load for providing filtered d-c voltage for the load;

switching means, interposed between said smoothing choke and said capacitor, for effectively reversing the connections between said capacitor and the output terminals of said rectifier bridge to facilitate regeneration of power from the load and back into the a-c power system during an interval of reverse energy transmission, said switching means including a first diode connected between said smoothing choke and a terminal of said capacitor, a second diode connected between another terminal of said capacitor and the negative output terminal of said rectifier bridge, a first controllable converter valve coupling cathodes of said first and said second diode to one another and a second controllable converter valve coupling anodes of said first and said second diode to one another; and control means operatively connected to said first and said second controllable converter valve for generating and delivering thereto a first pulse-width-modulated pulse sequence and second pulse-width-modulated pulse sequence, respectively, to control the amount of energy fed to said load from said a-c power system during said interval of forward energy transmission and to control the amount of energy fed to said a-c power system from said load during said interval of reverse energy transmission.

2. The d-c power supply defined in claim 1 wherein, during said interval of forward energy transmission, pulses in said first pulse-width-modulated pulse sequence are staggered in time with respect to pulses of said second pulse-width-modulated pulse sequence and have pulse widths so related to pulse widths of the pulses of said second pulse-width-modulated pulse sequence that said first and said second controllable converter valve are both blocked between duty cycles, whereby current built up over said smoothing choke during said interval of forward enery transmission flows as charging current into said capacitor.

3. The d-c power supply defined in claim 1 or 2, further comprising firing means operatively connected to said rectifying means for driving said rectifying means in an uncontrolled rectifier mode during said interval of forward energy transmission.

4. The d-c power supply defined in claim 1 wherein, during said interval of reverse energy transmission, pulses in said first pulse-width-modulated pulse sequence are staggered in time with respect to pulses of said second pulse-width-modulated pulse sequence and partially overlap respective pulses thereof, said control means including modulation means for changing the degree of overlap between pulses of said first pulse-width-modulated pulse sequence and pulses of said second pulse-width-modulated pulse sequence, whereby current flowing back to said a-c power system from said load has an adjustable mean value.

5. The d-c power supply defined in claim 4, further comprising firing means operatively connected to said rectifying means for driving said rectifying means, during said interval of reverse enery transmission, in a controlled rectifier mode wherein a control angle of said rectifying means is maintained at a constant value.

6. The d-c power supply defined in claim 4 wherein said rectifier bridge includes a plurality of thyristors, said control means blocking said first and said second controllable converter valve during said interval of reverse energy transmission for a time span corresponding to a recovery time of said thyristors.

7. The d-c power supply defined in claim 1, 2 or 4 wherein said control means includes (a) first summing means operatively connected to output leads of the d-c power supply for forming a first difference between an actual d-c output voltage of the d-c power supply and a reference voltage, (b) voltage regulating means including a first integrator operatively linked to said first summing means for generating a reference current in response to said difference, (c) second summing means at an output of said voltage regulating means for forming a second difference between said reference current and an actual current flowing in the d-c power supply between said load and said a-c power system, (d) current regulating means including a second integrator operatively linked to said second summing means for generating in response to said second difference an error signal related to a difference between the magnitude of actual energy flow through the d-c power supply and the magnitude of desired energy flow therethrough, (e) commutation means operatively tied to said voltage regulating means for generating a polarity signal indicating the polarity of said first difference, and (f) modulation means operatively connected to said current regulating means and said commutation means for generating said first and said second pulse-width-modulated pulse sequence in response to said error signal and said polarity signal, said modulation means being operatively connected to said first and said second controllable converter valve for transmitting said first and said second pulse-width-modulated pulse sequence respectively thereto, said commutation means being operatively linked to said rectifying means for controlling the operation thereof during said interval of reverse energy transmission.

8. The d-c power supply defined in claim 7, further comprising a positive line and a negative line respectively connected to the positive and the negative output terminal of said rectifying means, said smoothing choke and said first diode being disposed in said positive line and another smoothing choke and said second diode being disposed in said negative line.

9. The d-c power supply defined in claim 1 wherein the d-c power supply has an actual output voltage and wherein said control means includes first means for monitoring the difference between said actual output voltage and a reference voltage, said control means further including second means operatively connected to said first means for modifying durations of pulses in said first pulse-width-modulated pulse sequence and said second pulse-width-modulated pulse sequence in response to the difference between said actual output voltage and said reference voltage.

10. The d-c power supply defined in claim 9 wherein said control means further includes third means for detecting the actual current in the d-c power supply between said load and said a-c power system, said control means further including fourth means operatively connected to said first means for generating, in response to a detected difference between said actual output voltage and said reference voltage, a signal coding a reference current, said control means also including fifth means operatively connected to said second, said third and said fourth means for inducing said second means to modify durations of pulses in said first pulse-width-modulated pulse sequence and said second pulse-width-modulated pulse sequence in response to the difference between said actual current and said reference current.

* * * * *